(12) United States Patent
Adachi et al.

(10) Patent No.: US 12,243,245 B2
(45) Date of Patent: Mar. 4, 2025

(54) TRAJECTORY ANALYSIS DEVICE AND TRAJECTORY ANALYSIS METHOD

(71) Applicant: Panasonic Intellectual Property Management Co., Ltd., Osaka (JP)

(72) Inventors: Takao Adachi, Hyogo (JP); Hidehiko Shin, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 358 days.

(21) Appl. No.: 17/842,954

(22) Filed: Jun. 17, 2022

(65) Prior Publication Data

US 2022/0319021 A1 Oct. 6, 2022

Related U.S. Application Data

(63) Continuation of application No. PCT/JP2020/043355, filed on Nov. 20, 2020.

(30) Foreign Application Priority Data

Dec. 26, 2019 (JP) .................................. 2019-236729

(51) Int. Cl.
*G06T 7/246* (2017.01)

(52) U.S. Cl.
CPC .... *G06T 7/248* (2017.01); *G06T 2207/10016* (2013.01); *G06T 2207/30196* (2013.01); *G06T 2207/30241* (2013.01)

(58) Field of Classification Search
CPC .......... G06T 7/248; G06T 2207/10016; G06T 2207/30196; G06T 2207/30241;
(Continued)

(56) References Cited

U.S. PATENT DOCUMENTS

2009/0257624 A1* 10/2009 Ikumi ................... G06Q 30/02
382/113
2015/0120237 A1 4/2015 Gouda et al.
(Continued)

FOREIGN PATENT DOCUMENTS

JP 2006-350751 12/2006
JP 2010-123069 6/2010
(Continued)

OTHER PUBLICATIONS

Extended European Search Report issued Jan. 10, 2023 in corresponding European Patent Application No. 20908264.3.
(Continued)

*Primary Examiner* — Samir A Ahmed
(74) *Attorney, Agent, or Firm* — Wenderoth, Lind & Ponack, L.L.P.

(57) ABSTRACT

A trajectory analysis device that displays relevant information on a trajectory of a moving object, comprising: a display interface to display the relevant information; a storage to store trajectory data indicating a plurality of trajectories and the relevant information; an input interface to receive input by a user operation; and a controller to control the display interface based on the relevant information and the user operation input on the input interface, wherein the controller causes the display interface to display one or more staying locations where trajectories stay, based on the trajectory data, receives an input result by a user operation selecting at least one of the staying locations, receives an input result by a user operation designating a designated location different from the selected staying location, and extracts the relevant information to be displayed on the display interface, based on the selected staying location and the designated location.

10 Claims, 13 Drawing Sheets

(58) Field of Classification Search
CPC ... G06T 7/246; G06F 3/0482; G06F 16/7335; G06Q 10/063; G06Q 30/02; G06Q 30/06
See application file for complete search history.

(56) References Cited

U.S. PATENT DOCUMENTS

| | | | |
|---|---|---|---|
| 2015/0269143 | A1 | 9/2015 | Park et al. |
| 2019/0279229 | A1 | 9/2019 | Warita |
| 2019/0378279 | A1* | 12/2019 | Hirakawa ................. G06T 7/20 |

FOREIGN PATENT DOCUMENTS

| | | | |
|---|---|---|---|
| JP | 2015-87841 | | 5/2015 |
| JP | 2017123026 A * | | 7/2017 |
| JP | 6319421 B2 * | | 5/2018 |
| WO | WO 2015129210 A1 * | | 9/2015 |
| WO | 2018/079456 | | 5/2018 |

OTHER PUBLICATIONS

International Search Report issued Feb. 22, 2021 in International (PCT) Application No. PCT/JP2020/043355, with English translation.

International Preliminary Report on Patentability (Chapter II) dated Jun. 30, 2022 in International (PCT) Application No. PCT/JP2020/043355.

* cited by examiner

Fig. 5

| MAP IMAGE | WIDTH | HEIGHT | SCALE |
|---|---|---|---|
| M1 | 100 | 100 | 1/40 |

| START TIME | END TIME | ID | X | Y |
|---|---|---|---|---|
| 09:00:00 | 09:05:00.0 | 1 | 10 | 10 |
| 09:05:30 | 09:10:00.0 | 1 | 40 | 40 |
| ⋮ | ⋮ | ⋮ | ⋮ | ⋮ |

| X | Y | WIDTH | HEIGHT | D4 |
|---|---|---|---|---|
| 40 | 40 | 5 | 5 | |
| : | : | : | : | |

SELECT STAYING AREA

TRAJECTORY ANALYSIS DEVICE AND TRAJECTORY ANALYSIS METHOD

BACKGROUND

1. Technical Field

The present disclosure relates to a trajectory analysis device and a trajectory analysis method that displays relevant information on a trajectory of a moving object.

2. Related Art

JP 2006-350751 A discloses a sales analysis device that analyzes a customer's trajectory, or flow line in a store. The sales analysis device of JP 2006-350751 A extracts trajectory data corresponding to a customer based on the purchase time of the customer selected by designating purchase information and displays the trajectory data. The extraction of the customer's trajectory data related to purchased goods by a customer is utilized for arranging display position of goods to increase the amount of sales per a customer in the store.

SUMMARY

The present disclosure provides a trajectory analysis device and a trajectory analysis method that can facilitate analysis of relevant information on a trajectory.

A trajectory analysis device according to one aspect of the present disclosure displays relevant information on a trajectory of a moving object. The trajectory analysis device includes a display interface, a storage, an input interface, and a controller. The display interface displays a trajectory and relevant information. The storage stores trajectory data indicating a plurality of trajectories and relevant information. The input interface receives input by a user operation. The controller controls the display interface based on the relevant information stored in the storage and the user operation input on the input interface. The controller causes the display interface to display one or more staying locations where the trajectories stay, based on the trajectory data, and receives, an input result by a user operation selecting at least one staying location via the input interface. The controller further receives an input result by a user operation designating a designated location different from the staying location selected, via the input interface, and extracts relevant information to be displayed on the display interface, based on the selected staying location and the designated location.

A trajectory analysis method according to one aspect of the present disclosure is a method displaying relevant information on a trajectory of a moving object. The trajectory analysis method, performed by a controller of a computer, includes steps of causing a display interface to display one or more staying location where a trajectory stays, based on trajectory data stored in a storage; receiving an input result through a user operation selecting at least one staying location via an input interface; receiving an input result through a user operation designating a designated location different from the selected staying location, via the input interface; and limiting relevant information to be displayed on the display interface, based on the selected staying location and the designated location.

According to the trajectory analysis device and the trajectory analysis method of the present disclosure, relevant information on a trajectory can be easily analyzed.

BRIEF DESCRIPTION OF THE DRAWINGS

FIG. 5 is a table for describing map data in the trajectory analysis device.

FIG. 6 is a table for describing staying data in the trajectory analysis device.

FIG. 7 is a table for describing area information in the trajectory analysis device.

DETAILED DESCRIPTION

Hereinafter, embodiments will be described in detail with reference to the drawings as appropriate. However, more detailed description than necessary may be omitted. For example, detailed descriptions of already well-known matters and duplicate descriptions for substantially the same configuration may be omitted. This is to avoid unnecessary redundancy of the following description and to facilitate the understanding of those skilled in the art. It should be noted that the inventor(s) provides the accompanying drawings and the following description in order that those skilled in the art fully understand the present disclosure, and does not intend the provided drawings and description limit the subject matter described in the claims.

First Embodiment

1. Configuration

Figure 1:
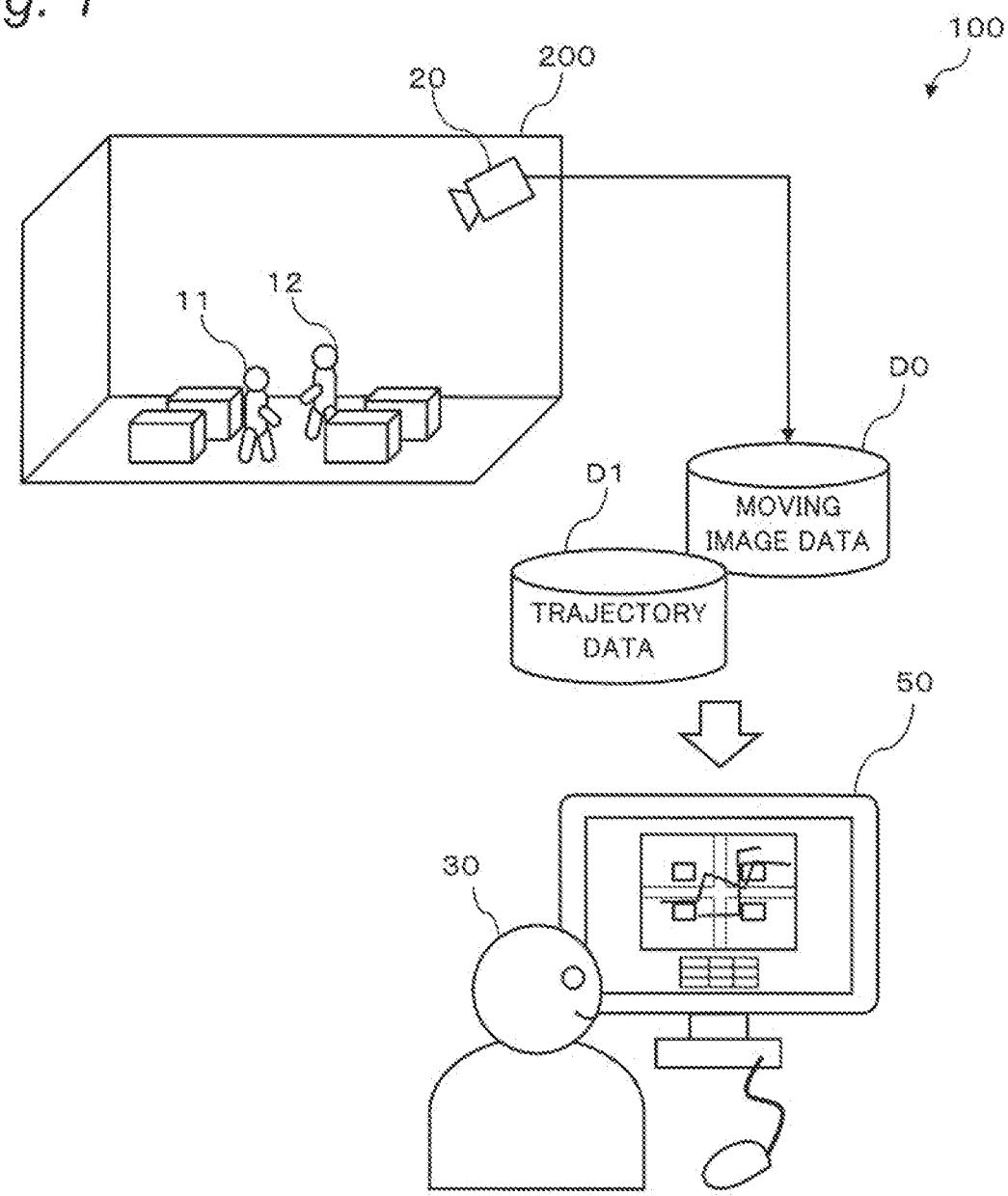
FIG. 1 is diagram illustrating an overview of a trajectory analysis system according to a first embodiment.

The trajectory analysis system according to a first embodiment will be described with reference to FIG. 1. FIG. 1 is a diagram illustrating an overview of a trajectory analysis system 100 according to the present embodiment.

1-1. Overview of Trajectory Analysis System

As illustrated in FIG. 1, the system 100 includes a camera 20 and a trajectory analysis device 50. This system 100 accumulates information such as trajectories, which are loci of movements of moving objects such as workers 11 and 12, in a workplace 200 such as a factory or a store. This system 100 is applicable to a case where a user 30, such as a manager or an analyst of the workplace 200, analyzes trajectories of the workers 11 and 12 to consider the layout of facilities and work efficiency.

In the system 100, the camera 20 is disposed so as to capture an image that covers an entire range in which the workers 11 and 12 move in the workplace 200. The camera 20 captures a moving image in the workplace 200 and generates moving image data D0, for example. The camera 20 may be an omnidirectional camera, a box camera, or the like. In the system 100 trajectory data D1 indicating various trajectories can be obtained based on the moving image data D0. The trajectory analysis device 50 according to the present embodiment presents the accumulated information such as the moving image data DO and the moving image data D1 so that the user 30 can perform an analysis.

1-2. Configuration of Trajectory Analysis Device

Figure 2:
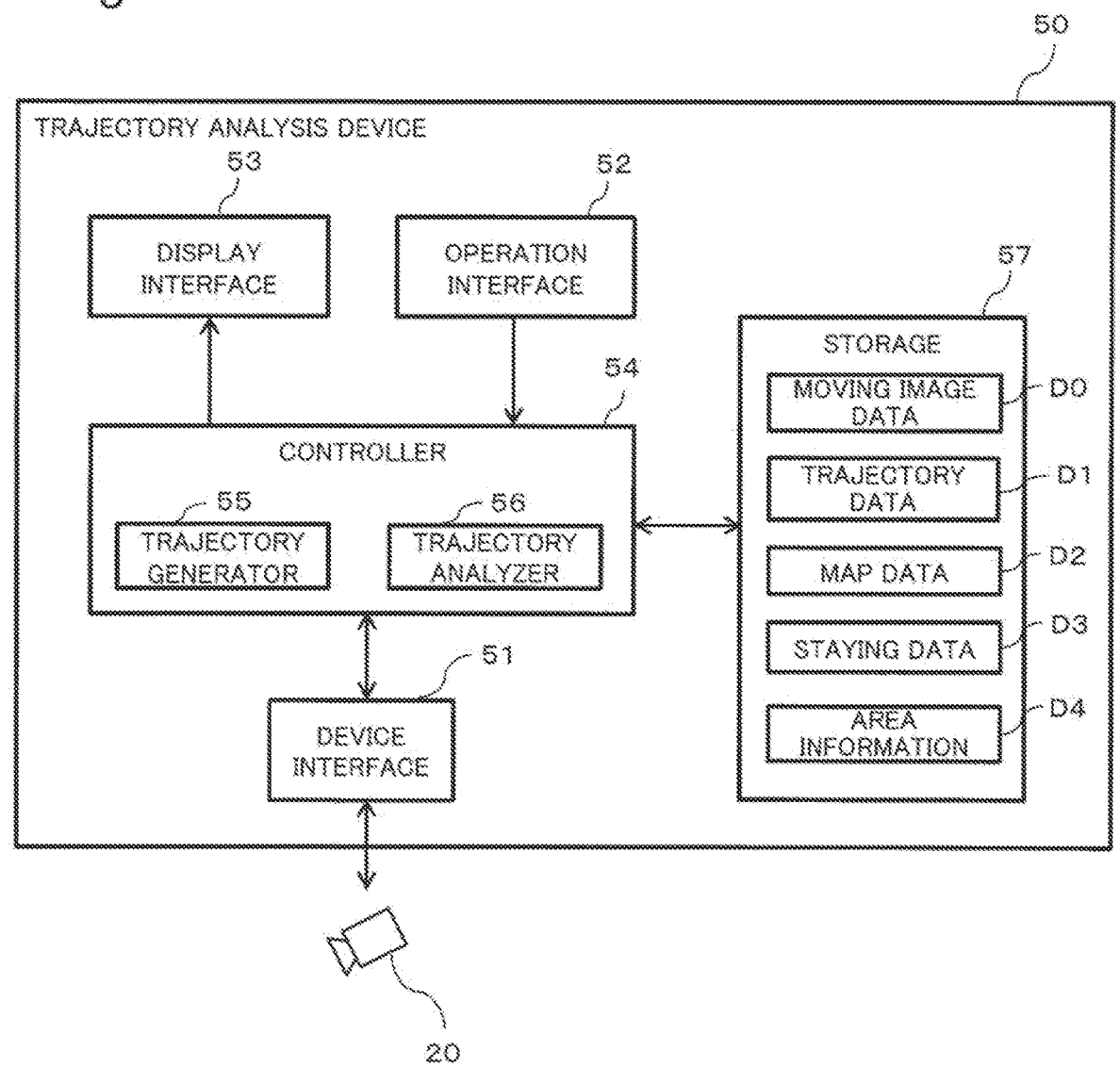
FIG. 2 is a block diagram illustrating a configuration of a trajectory analysis device of the trajectory analysis system.

Hereinafter, the configuration of the trajectory analysis device 50 in the system 100 will be described with reference to FIG. 2. FIG. 2 is a block diagram illustrating the configuration of the trajectory analysis device 50 according to the present embodiment.

The trajectory analysis device 50 is implemented with an information processing device such as a personal computer or a tablet terminal. The trajectory analysis device 30 illustrated in FIG. 2 includes a device interface 51 for connection with an external device such as the camera 20, an operation interface 52 that receives an operation from the user 30, a display interface 53 for screen display, a controller 54 that controls an operation of the trajectory analysis device 50, and a storage 57 that stores data and programs.

The device interface 51 is a connection circuit that performs connection and data communication between devices, in accordance with a standard such as Universal Serial Bus (USB), Institute of Electrical and Electronics Engineers (IEEE) 802.11 or Bluetooth. The trajectory analysis system 100 transfers moving image data from the camera 20 to the trajectory analysis device 50 via the device interface 51. The device interface 51 may constitute the input interface for inputting a user operation from an external device.

The operation interface 52 is implemented with any of a keyboard, a mouse, a trackpad, a touch panel, and the like, or a combination thereof, for example. The operation interface 52 acquires various information input by the user operation. The operation interface 52 is an example of the input interface of the trajectory analysis device 50 in the present embodiment.

The display interface 53 is implemented with, a liquid crystal display or an organic electroluminescence (EL) display, for example. The display interface 53 may display various types of information such as various icons for operating the operation interface 52 and information input from the operation interface 52. Various display devices such as a projector and a head-mounted display may be used as the display interface 53. Further when an external display device is used, the display interface 53 of the trajectory analysis device 50 may be an output interface circuit transmitting a video signal or the like conforming to a High-Definition Multimedia Interface (HDMI) standard or the like, for example.

The controller 54 is implemented with a central processing unit (CPU) or a microprocessor unit (MPU) that cooperates with software to achieve predetermined functions, for example. The controller 54 reads out the data and the programs stored in the storage 57, end performs various processing to achieve various functions. For example, the controller 54 executes a program including a command set to execute various processing of the trajectory analysis device 50. The above programs are application programs, and may be provided from a communication network such as the Internet, or may be stored in a portable storage medium, for example.

In the trajectory analysis device 50 illustrated in FIG. 2, the controller 54 includes a trajectory generator 55 and a trajectory analyzer 56 as functional components, for example. The trajectory generator 55 generates the trajectory data D1 and outputs the trajectory data D1 to the storage 57, by applying an image recognition technique to the moving image data D0 stored in the storage 57, for example. The trajectory analyzer 56 performs processing to filter information such as trajectories based on the trajectory data D1, in accordance with a user operation on the operation interface 52, and to display the filtered information. The configuration of the trajectory analyzer 56 will be described later.

The controller 54 may be a hardware circuit such as a dedicated electronic circuit or a reconfigurable electronic circuit designed to perform a predetermined function. The controller 54 may be implemented with a semiconductor integrated circuit such as a CPU, an MPU, a graphics processing unit (GPU), a general purpose graphics processing unit (GPGPU), a time processing unit (TPU), a microcomputer, a digital signal processor (DSP), a field-programmable grid array (FPGA) or an application specific integrated circuit (ASIC). Further, the controller 54 may include an internal memory as a temporary storage area for holding various data and programs.

The storage 57 is a recording medium that stores data and programs, and is implemented with a hard disk drive (HDD) or a semiconductor storage device (SSD), for example. The storage 57 stores various data such as the moving image data D0, the trajectory data D1, and map data D2 indicating a map of the workplace 200. The map data D2 illustrated in FIG. 5 is generated by the controller 54 from an image of a map input by the user 30, for example. Details of the trajectory data D1 and the map data D2 stored in the storage 57 will be described later. The storage 57 may include a temporary storage element implemented with a RAM such as a dynamic random access memory (DRAM) or a static random access memory (SRAM), and may function as a work area of the controller 54. For example, the storage 57 temporarily stores the staying data D3 and the area information D4, which will be described later.

1-3. Configuration of Trajectory Analyzer

Figure 3:
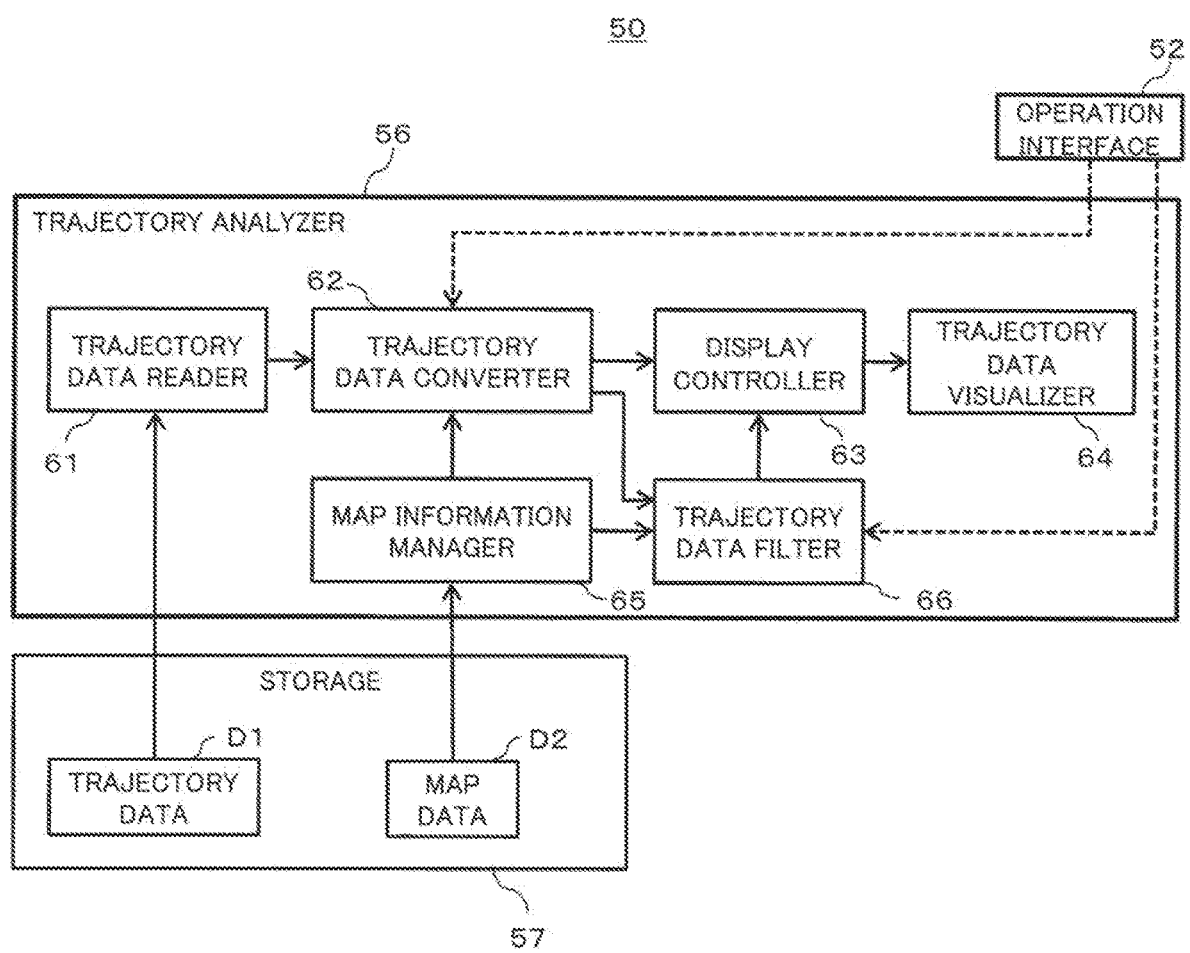
FIG. 3 is a block diagram illustrating a functional configuration of a trajectory analyzer in the trajectory analysis device.

Hereinafter, the configuration of the trajectory analyzer 56 will be described with reference to FIG. 3. FIG. 3 is a block diagram illustrating a functional configuration of the trajectory analyzer 56 according to the present embodiment.

In FIG. 3, the trajectory analyzer 56 includes a trajectory data reader 61, a trajectory data converter 62, a display controller 63, a trajectory data visualizer 64 that causes the display interface 53 to display trajectories and information relating to the trajectories, a map information manager 63 that manages the map data D2, and a trajectory data filter 66.

The trajectory data reader 61 reads in the trajectory data D1 stored in the storage 57. The trajectory data converter 62 converts the trajectory data D1 read in from the trajectory data reader 61 into the staying data D3 (see FIG. 6). Staying data D3 indicates the position and time where and when stay of the moving objects such as the workers 11 and 12 is detected. The trajectory data converter 62 acquires the map data D2 from the storage 57 via the map information manager 65, and notifies the display controller 63 of the information in which the map data D2 is associated with the staying data D3. The trajectory data converter 62 further notifies the display controller 63 of information in which the moving images of the moving image data D0, acquired from the storage 57, are associated with the trajectories based on the trajectory data D1.

The display controller 63 causes the trajectory data visualizer 64 to display various information notified from the trajectory data converter 62 or the trajectory data filter 66. The trajectory data filter 66 determines information that is displayed on the display interface 53 by the trajectory data visualizer 64, in accordance with the area information D4 input by a user operation on the operation interface 52 to designate a passing position of the trajectories.

1-4. Various Data

The trajectory analysis device 50 according to the present embodiment stores the trajectory data D1, the map data D2, the staying data D3, and the area information D4 in the storage 57 as described above. The trajectory data D1, the map data D2, the staying data D3, and the area information D4 will be described with reference to FIGS. 4 to 7.

Figure 4:
FIG. 4 is a table for describing trajectory data in the trajectory analysis device.

FIG. 4 is a table for describing the trajectory data D1 in the trajectory analysis device 50. The trajectory data D1 is generated by the trajectory generator 55 based on the moving image data D0. For example, the trajectory generator 55 applies geometric correction to each frame of the moving image data D0 so that each frame fits with the map image included in the map data D2. Then the trajectory generator 55 detects the moving objects such as the workers 11 and 12 using the image recognition technique. As illustrated in FIG. 4, the trajectory data D1 includes "time" when a frame is recorded, "ID" identifying a detected moving object, and coordinates "X" and "Y" on a map image on which a moving object is detected in each frame. The trajectory data D1 records "Time", "ID", "X", and "Y" associated with each other, for example. The coordinates X and Y are the coordinates in a width direction and a height direction of the map image, respectively.

The trajectory analyzer 56 displays trajectories by combining the coordinates X and Y of data having identical ID with each other, in a chronological order, in accordance with the times associated with the coordinates in the trajectory data D1. Further, the trajectory analyzer 56 displays, from the moving image data D0, a moving image of time spans corresponding to the trajectory, based on the time spans combined as the trajectory in the trajectory data D1. As illustrated in FIG. 4, the trajectory data D1 may include data having a plurality of different IDs during the same time in a case where a plurality of moving objects is detected at the same time.

FIG. 5 is a table for describing the map data D2. As illustrated in FIG. 5, the map data D2 is recorded with "map image", "width", "height", and "scale" associated with each other, for example. In the map data D2, "map image" indicates image data of a map such as the layout of various facilities in the workplace 200. "Width" and "height" indicate a width and a height of the map image. "Scale" indicates a scale of the workplace 200 and the map. In the example of FIG. 5, the unit of the width and height of the image is centimeters, for example. The map image is acquired in advance from the outside of the trajectory analysis device 50 by the device interface 51, for example, in response to a user operation on the operation interface 52.

FIG. 6 is a table for describing the staying data D3. As illustrated in FIG. 6, the staying data D3 stores, as a data record, "start time", "end time", "ID", "X", and "Y" associated with each other, for example. The staying data D3 is acquired by the trajectory data converter 62 of the trajectory analyzer 56, illustrated in FIG. 3, converting the trajectory data D1. When an identical ID is detected within a predetermined range of the coordinates in the trajectory data D1 for a predetermined time or longer, the trajectory data converter 62 determines that a moving object identified by the ID stayed, and generates the staying data D3. The predetermined range is a narrow range that can be regarded as one point, and for example, coordinates of the center of the range are used as the coordinates in the staying data D3. The predetermined time is such a time long enough that the moving object can be regarded as stopping within the predetermined range.

In the staying data D3, "start time" and "end time" respectively indicate start time and end time of the staying based on the time recorded in the trajectory data D1. "ID" indicates an ID detected in the trajectory data D1 from the start time to the end time. "X" and "Y" indicate the coordinates X and Y of one point in a range of a vicinity of the coordinates determined as the staying. For example, the coordinates indicate an intersection of regions obtained by dividing the map image into a grid pattern at predetermined intervals.

In the generation of the staying data D3, the user 30 may set a predetermined time, a predetermined interval, and a range indicating the vicinity of predetermined coordinates. Further, the staying data D3 may include data having a plurality of different IDs at the same time when the staying of a plurality of moving objects is detected at the same time.

Figure 7:
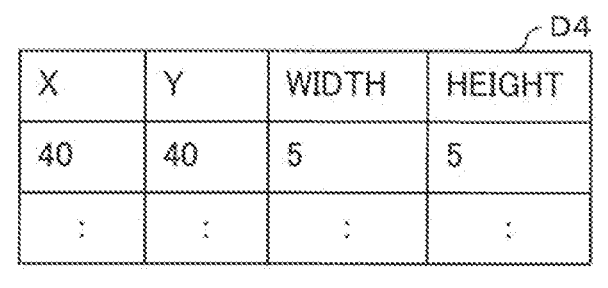

FIG. 7 is a table for describing the area information D4 in the trajectory analysis device 50. For example, the area information D4 is input into the trajectory data filter 66 by a user operation designating a rectangular area on the map image displayed on the display interface 53 through the operation interface 52. For example, as illustrated in FIG. 7, the area information D4 is stored with "X", "Y", "width", and "height" associated with each other. In the area information D4 illustrated in FIG. 7, "X" and "Y" indicate one vertex of the rectangular area designated on the map image by the user 30. "Width" and "height" indicate the width and height of the rectangular area, in centimeters for example.

2. Operation

The operation of the trajectory analysis system 100 and the trajectory analysis device 50 configured as described above will be described below.

2-1. Overview of Operation

The overview of the operation of the trajectory analysis system 100 and the trajectory analysis device 50 according to the present embodiment will be described with reference to FIGS. 1, 3, and 9.

In this system 100, the trajectory analysis device 50 acquires the moving image data D0, and accumulates the moving image data D0 in the storage 57. For example, as illustrated in FIG. 1, the moving image data D0 is acquired by the camera 20 capturing a moving image of the workplace 200 where the workers 11, 12 and the like move. The trajectory analysis device 50 generates the trajectory data D1 from the moving image data D0, in the trajectory generator 55 for example. The trajectory analysis device 50 according to the present embodiment displays information on a trajectory based on the trajectory data D1, in response to an operation performed by the user 30, so that the user 30 can analyze the trajectory data D1. Display examples of the trajectory analysis device 50 are illustrated in FIGS. 8A to 9B.

Figure 8A:
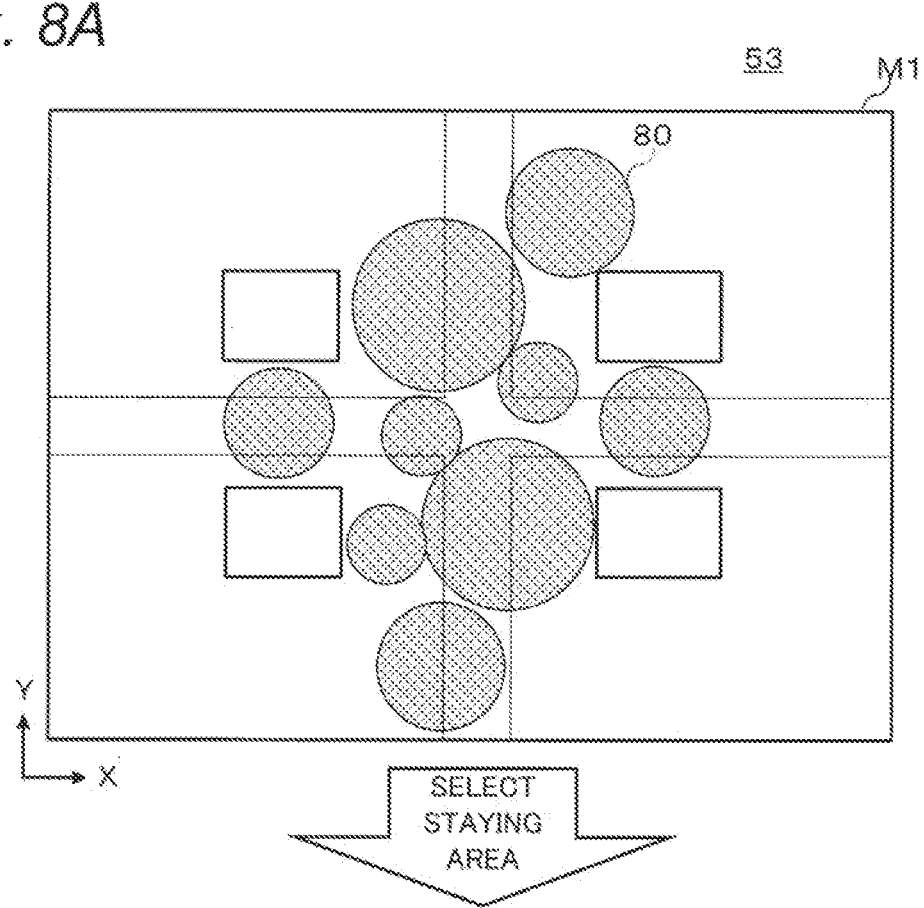
FIGS. 8A and 8B are diagrams illustrating display examples of staying areas and trajectories in the trajectory analysis device according to the first embodiment.

FIG. 8A illustrates a state before the display interface 53 of the trajectory analysis device 50 displays the trajectories. In the display example of FIG. 8A, staying areas 80 are displayed on a map image M1 of the map data D2. The staying areas 80 indicate positions where a trajectory stays, based on the staying data D3 obtained from the trajectory data D1. In this display example, the display interface 53 of the trajectory analysis device 50 displays a plurality of staying areas 80. Each of the staying areas 80 is an example of the staying location in the present embodiment.

Each of the staying areas 80 has a size according to the length of a period during which the moving objects such as the workers 11 and 12 stay. For example, through control by the display controller 63, each of the staying areas 80 is displayed as a circle, whose center is the coordinates X and Y in the staying data D3, that has a radius being larger as the staying period is longer, that is, as the difference between the start time and the end time in the staying data D3 is larger.

The trajectory analysis device 50 can accurately visualize the tendency of staying of the workers 11 and 12 in the workplace 200, using the staying areas 80 obtained through accumulating a large number of trajectories based on the moving image data D0 over a long period of time, for example.

Figure 8B:
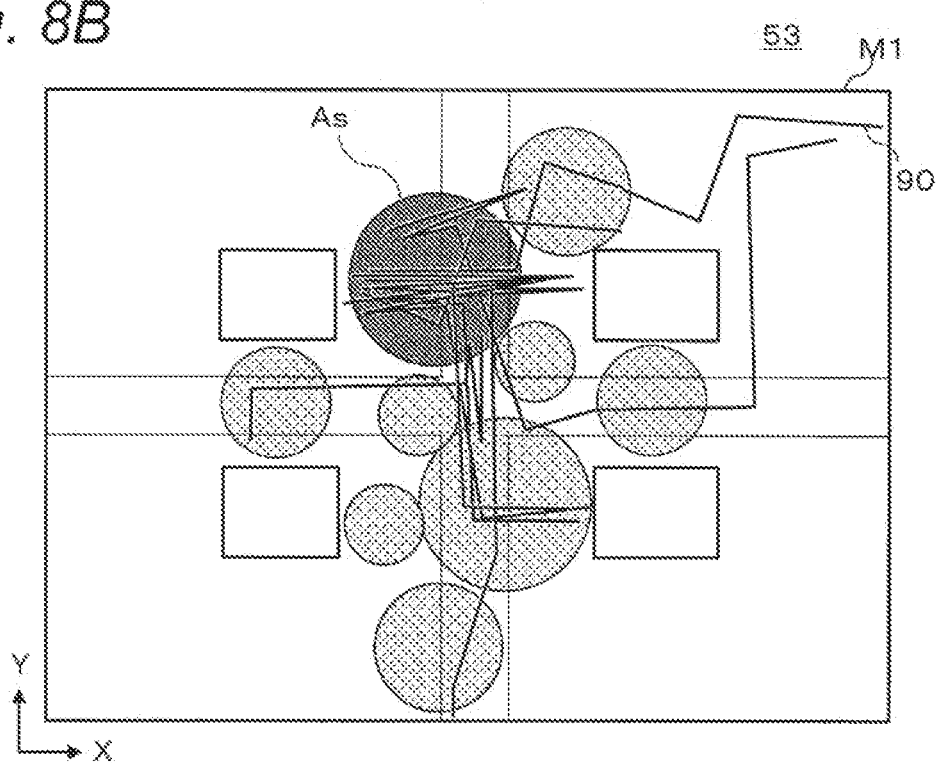

FIG. 8B exemplifies a state in which the trajectories 90 are displayed after the state of FIG. 8A. In the present embodiment, the trajectory analysis device 50 accepts a user operation selecting one staying area from the plurality of staying areas 80 through the operation interface 52 at the time of display illustrated in FIG. 8A. The specific staying area selected by such a user operation is hereinafter referred to as "staying area As". For example, the user 30 can select the staying area As where the trajectories 90 are to be analyzed, in consideration of the works done by the workers 11 and 12 in the workplace 200.

Figure 9A:
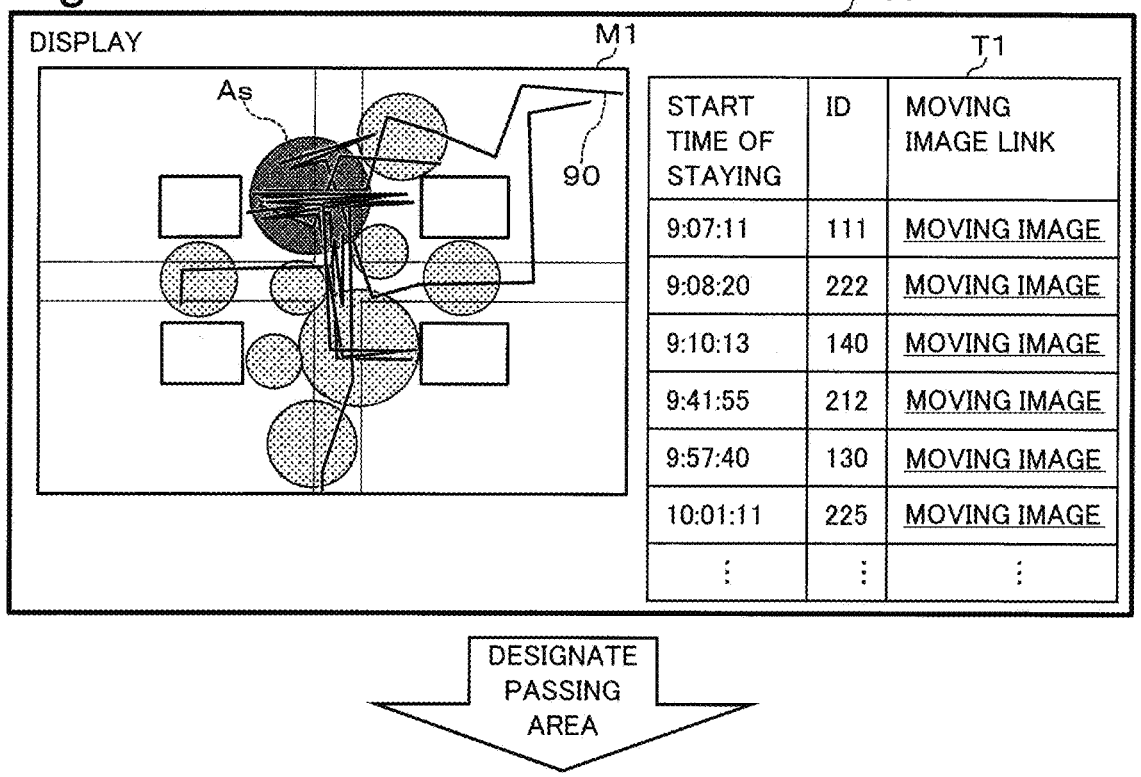
FIGS. 9A and 9B are diagrams illustrating display examples of a case where a staying area is selected in the trajectory analysis device according to the first embodiment.

FIG. 9A illustrates a display example of the display interface 53 displaying a moving image list T1 in the state of FIG. 8B. In this display example, the display interface 53 displays a plurality of trajectories 90 staying in the selected staying area As after the state of FIG. 8A, and also displays the corresponding moving image list T1. For example, the moving image list T1 includes moving image links, for the respective IDs of the displayed trajectories 90, associated with the staying start time in the staying data D3. The moving image links enables displaying moving images of the moving image data D0 corresponding to the respective trajectories 90.

With the moving image list T1, the trajectory analysis device 50 enables viewing of the moving images associated with the respective displayed trajectories 90. For example, the viewing of the moving images enable the user 30 to analyze factors that form the trajectories 90 which are based on the moving images. The moving image list T1 and the moving images indicated by the moving image links in the moving image list T1 are the example of the relevant information in the present embodiment.

Here, when staying occurs in the staying area As where a large number of trajectories 90 are selected as in the display example of FIG. 9A, the moving image list T1 includes a large number of moving image links associated with the respective trajectories 90. In this way, if moving image candidates are displayed excessively, it takes an excessive length of time for the user 30 to view all the moving images. Therefore, even if the user 30 selects the staying area As to be analyzed, it may be difficult to find a intended moving image, and thus the analysis of trajectories becomes difficult. Therefore, the trajectory analysis device 50 according to the present embodiment additionally accepts a user operation designating a passing area through which the trajectory passes, in addition to selecting the staying area As, to narrow down the candidates for the moving images.

Figure 9B:
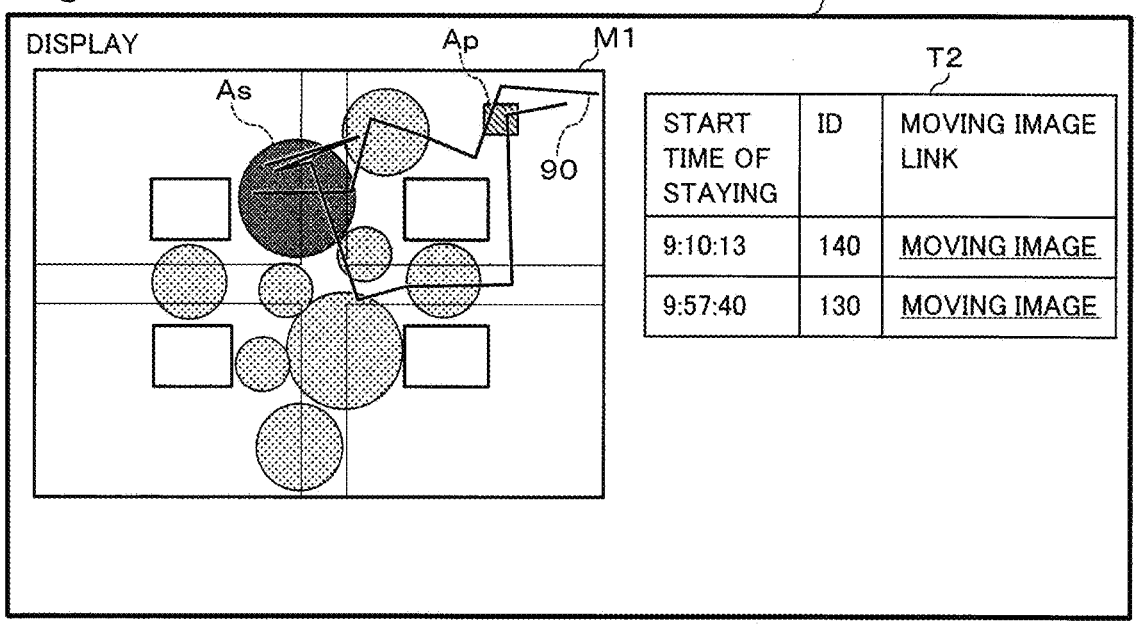

FIG. 9B illustrates a display example in a case where a passing area Ap is designated by the user operation in the state of FIG. 9A. In this display example, the number of the displayed trajectories 90 is reduced from the large number of trajectories 90 displayed in FIG. 9A to two trajectories passing through the passing area Ap. Further, a moving image list T2 includes only moving image links associated with the two trajectories 90 that staying in the staying area As and pass through the passing area Ap. With the trajectory analysis device 50 according to the present embodiment that performs such display, the user 30 only needs to check the moving images indicated by the small number of moving image links for the analysis of the trajectories. Thus, the user 30 can easily analyze the trajectories and the information related to them. Further, the trajectory analysis device 50 only needs to generate a small number of moving image links, therefore can reduce the processing load on display of relevant information.

2-2. Operation of Trajectory Analyzer

The operation of the trajectory analyzer 56 in the trajectory analysis device 50 according to the present embodiment will be described with reference to FIGS. 3 and 10.

Figure 10:
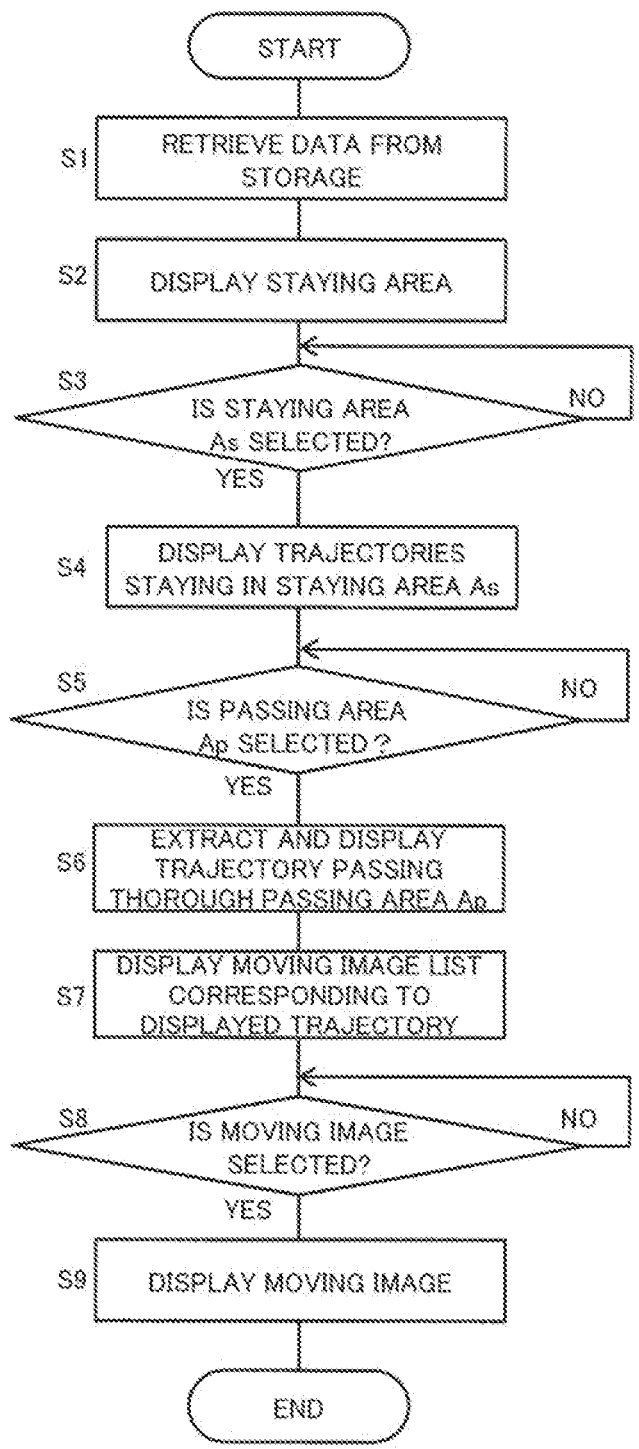
FIG. 10 is a flowchart for describing an operation of the trajectory analyser in the trajectory analysis device according to the first embodiment.

FIG. 10 is a flowchart for describing the operation of the trajectory analyzer 56. Processing illustrated in the flowchart of FIG. 10 is executed by the controller 54 functioning as the trajectory analyzer 56 after performing the operation as the trajectory generator 55, for example. The flowchart of FIG. 10 is started when the user 30 inputs a predetermined operation for starting the analysis of the trajectories or the like through the operation interface 52, for example.

First, the controller 34 as the trajectory analyzer 56 acquires various data from the storage 57 (S1). For example, as illustrated in FIG. 3, the trajectory data reader 61 of the trajectory analyzer 56 reads in the trajectory data D1 (see FIG. 4). In addition, the map information manager 65 acquires the map data D2 (see FIG. 5). The trajectory data converter 62 generates the staying data D3 (see FIG. 6) based on the trajectory data D1 acquired by the trajectory data reader 61. Then the trajectory data converter 62 outputs, to the display controller 63, the staying data D3 as well as the map data D2 from the map information manager 65.

Next, the controller 54, functioning as the display controller 63 and the trajectory data visualizer 64 causes the display interface 53 to display, as illustrated in FIG. 8A, the staying areas 80 based on the staying data D3 with the staying areas 80 being superimposed on the map image M1 of the map data D2 (S2), for example. Specifically, the trajectory data visualizer 64 displays the staying areas 80 with the coordinates X and Y in the map data D2 being associated with the coordinates X and Y in the staying data D3.

Next, the controller 54 determines whether the user operation for selecting the staying area As is input through the operation interface 52 (S3). For example, the operation selecting the staying area As is an operation clicking the staying area As with a mouse or the like or an operation touching with a touch pad or the like.

When the controller 54 determines that the operation selecting the staying area As is not input (NO in S3), the controller 54 repeats the determination in step S3.

When the operation selecting the staying area As is input (YES in S3), the controller 54 causes the display interface 53 to display the trajectories 90 staying in the staying area As on the map image M1 as illustrated in FIG. 8B, for example (S4). The processing in this step is performed with reference to the staying data D3 generated by the controller 54 functioning as the trajectory data converter 62, for example.

For example, in step S4, the controller 54 first collects data records corresponding to the coordinates X and Y of the selected staying area As in the staying data D3 illustrated in FIG. 6. Next, the controller 54 detects the times in the trajectory data D1 exemplified in FIG. 4, the times in the data record at which the coordinates X and Y are collected from the staying data D3, and the IDs of the trajectories including the coordinates X and Y. As a result, the controller 54 extracts the trajectories 90 staying in the staying areas As. During this processing, the controller 54 as the trajectory data converter 62 generates moving image links for displaying the moving images associated with the extracted trajectories, and may display the moving image list T1 as illustrated in FIG. 9A, for example.

Next, the controller 54, functioning as the trajectory data filter 66, determines whether a user operation designating the passing area Ap has been input through the operation interface 52 (S5), for example. For example, the operation designating the passing area Ap is an operation for designating rectangular area as the passing area Ap on the map image M1 through a mouse or a touch pad. The passing area Ap is the example of a designated location in the present embodiment.

When the controller 54 determines that the operation designating the passing area Ap is not input (NO in S5), the controller 54 repeats the determination in step S5.

When the operation designating the passing area Ap is input (YES in S5), the controller 54 extracts one or more trajectory 90 passing through the passing area Ap from the trajectories 90 staying in the staying area As, and causes the display interface 53 to display the extracted trajectory 90 (S6). For example, the processing in this step is performed by the controller 54 acquiring the area information D4 (see FIG. 7), which indicates the passing area Ap, from the operation interface 52 and functioning as the trajectory data filter 66.

In step S6, the trajectory data filter 66 acquires, from the trajectory data converter 62, information indicating the trajectories 90 extracted using the staying area As, for example. From the trajectories 90 in the acquired information, the trajectory data filter 66 extracts the trajectories 90 staying in the staying area As and passing through the passing area Ap, by detecting the trajectories 90 including the coordinates X and Y within the range of the passing area Ap indicated by the area information D4.

Further, the controller 54 as the trajectory data filter 66 generates the moving image links indicating the moving images associated with the determined trajectories, and causes the display interface 53 to display the moving image list T2 (S7). For example, FIG. 9B is displayed by the processing in steps S6 and S7.

Next, the controller 54 determines whether the user operation selecting a moving image to be displayed, through the moving image link in the moving image list T2, is input through the operation interface 52 (S8). For example, the operation selecting a moving image is an operation clicking a moving image link with a mouse or the like, or a touch operation with a touch pad or the like.

When the operation selecting a moving image is input (YES in S8), the controller 54 causes the display interface 53 to display the selected moving image to be played back (S9).

On the other hand, when the controller 54 determines that the operation selecting a moving image is not input (NO in S8), the controller 54 repeats the determination in step S8, for example.

The controller 54 ends the processing according to this flowchart after the moving image is played back and displayed (S9). In steps S8 and S9, a plurality of moving images may be played back and displayed.

According no the above processing performed by the trajectory analyzer 56, the staying areas 80 are displayed based on the trajectory data D1 (S2), and the trajectories 90 staying in the staying area As selected by the user 30 are displayed (S4). In the trajectory analysis device 50 according to the present embodiment, the controller 54 further extracts one or more trajectory 90 based on the passing area Ap designated by the user operation in addition to the staying area As, and displays the extracted trajectories 90 and the corresponding moving image list T2 (S6 and S7). In this way, the trajectory analyzer 56 narrows down the trajectories 90 and the moving images to be displayed in accordance with the passing area Ap specified by the user. As a result, the user 30 can easily check the moving images associated with the trajectories 90 when analyzing the information related to the trajectories 90.

In the present embodiment, the controller 54 as the trajectory analyzer 56 extracts the trajectories 90 passing through the passing area Ap designated by the user 30 and displays the trajectories 90 together with the corresponding moving image list T2 (S6 and S7). For example, the user 30 can designate a place unrelated to the work expected from the selected staying area As, as the passing area Ap in the workplace 200. As a result, it is possible to quickly check the moving image of the interesting trajectory 90 that includes unexpected behavior during the expected work as mentioned above, and to analyze the moving image of the trajectory that is easy to use for considering the equipment layout and work efficiency of the workplace 200.

Further, when the controller 54 determines in step S8 that the moving image is not selected (NO in S8), the controller 54 repeatedly performs the determination in step S8 in the present embodiment, but the operation of the present disclosure is not limited to this. For example, the controller 54 may performs the processing of step S5 and subsequent steps again. Further, the number of staying area As selected in step S3 is not limited to one, and a plurality of staying areas As may be selected. In this case, the controller 54 may cause the display interface 53 to display the trajectories 90 staying in all the selected staying areas As, or display the trajectories 90 staying in any of the selected staying areas As.

3. Effects

As described above, in the present embodiment, the trajectory analysis device 50 of the trajectory analysis system 100 displays relevant information on the trajectories of the moving objects such as the workers 11 and 12. The trajectory analysis device 50 includes the display interface 53, the storage 57, the operation interface 52 (input interface), and the controller 54. The display interface 53 displays the trajectories 90, the moving images, and moving image lists T1 to T2 associated with the trajectories 90 as one example of the relevant information (S4, S6, S7, and S9). The storage 57 stores the trajectory data D1 indicating the plurality of trajectories 90 and the relevant information. The operation interface 52 accepts input through the user operations (S3 and S8). The controller 54 controls the display Interface 53 based on the information stored in the storage 57 and the user operation input through the operation interface 52. The controller 54 causes on the display interface 53 to display the staying areas 80 as the example of the staying location where the trajectories stay, based on the trajectory data D1. The controller 54 then receives the input result through the user operation for selecting at least one staying area from the operation interface 52 (S2 and S3). The controller 54 further receives the user operation for designating the passing area Ap as the example of the designated location different from the selected staying area As from the operation interface 52, and extracts the relevant information to be displayed on the display interface 53, based on the selected staying area As and the passing area Ap (S6 and S7).

As described above, in addition to selecting the staying area As, the trajectory analysis device 50 limits the relevant information to be displayed on the display interface 53 by designating the passing area Ap. The trajectory analysis device 50 limits the relevant information to be displayed in accordance with the designation by the user 30 of the trajectory analysis system 100 to enable the user 30 to easily analyze the relevant information on the trajectories. Further, the trajectory analysis device 50 can reduce the processing load for display, by limiting the relevant information to be displayed.

In the present embodiment, the controller 54 limits relevant information to be displayed on the display interface 53 to the moving image list T2 as the example of the relevant information on trajectories that stay in the selected staying area As and pass through the designated passing area Ap among the plurality of trajectories 90 (S7). As a result, the trajectory analysis device 50 filters the relevant information to be checked by the user 30 at two stages according to the staying area As and the passing area Ap and displays the filtered information. This enables the user 30 to easily analyze the relevant information on the trajectories.

In the present embodiment, when the user operation selecting the staying area As is input, the controller 54 causes the display interface 53 to display the trajectories staying in the selected staying area As among the plurality of trajectories 90 (S4). When the user operation for designating the passing area Ap is input, the controller 54 limits, among the trajectories staying in the staying area As, a trajectory to be displayed on the display interface 53, based on the designated passing area Ap (S6).

According to the above trajectory analysis device 50, when the passing area Ap is designated by the user 30, in addition to the selection of the staying area As, only the trajectories that staying in the staying area As and pass through the passing area Ap are displayed. For example, if a location unrelated to a work in the staying area As of the workplace 200 is designated as the passing area Ap, trajectories including behaviors unrelated to the above work and its relevant information can be extracted. As a result, the trajectory analysis device 50 can make it easier for the user 30 to analyze the relevant information on trajectories needs to be considered by the user 30.

In the present embodiment, the storage 57 further stores a map in which the moving objects such as workers 11 and 12 are located, that is, the map data D2 indicating the map image M1. The controller 54 causes the display interface 53 to displays the staying areas 80 superimposed on the map. As a result, the user 30 can check the trajectories on the map image M1 of the map data D2, and thus easily analyze the trajectories and the like.

In the present embodiment, the relevant information includes moving images related to the moving bodies and at least one of the moving image lists T1 and T2 as the example of the list including moving image candidates. As a result, the user 30 can check the movements of the moving objects using the moving images more specifically.

In a trajectory analysis method according to the present embodiment, relevant information on a trajectory of a moving object is displayed. The method includes the steps S2 and S3 at which the controller 54 causes the display interface 53 to display the staying areas 80, as the example of the staying location where the trajectories stay, based on the trajectory data D1 stored in the storage 57, and receives, from the operation interface 52 (input interface), an input result through the user operation selecting at least one staying areas, and the steps S5 to S7 at which the controller 54 receives, from the operation interface 52, an input through the user operation designating the passing area Ap as the example of another location different from the staying location As selected, and limits relevant information to be displayed on the display interface 53, based on the staying location As and the designated location Ap.

In the present embodiment, a program for causing a controller of a computer to perform the above-mentioned trajectory analysis method is provided. The trajectory analysis method according to the present embodiment enables the user 30 to easily analyze the relevant information on trajectories.

Second Embodiment

Hereinafter, a second embodiment will be described with reference to the drawings. The first embodiment has described the trajectory analysis system 100 that displays the trajectories 90 after selecting the staying area As and receives the operation for designating the passing area Ap. The second embodiment will describe the trajectory analysis system 100 that displays a number of passing times of trajectories in the map data D2 and accepts the user operation designating a passing location.

Hereinafter, a trajectory analysis device 50 of a trajectory analysis system 100 according to the present embodiment will be described, while the description of the same configuration and operations as these in the trajectory analysis system 100 according to the first embodiment is omitted as appropriate.

Figure 11:
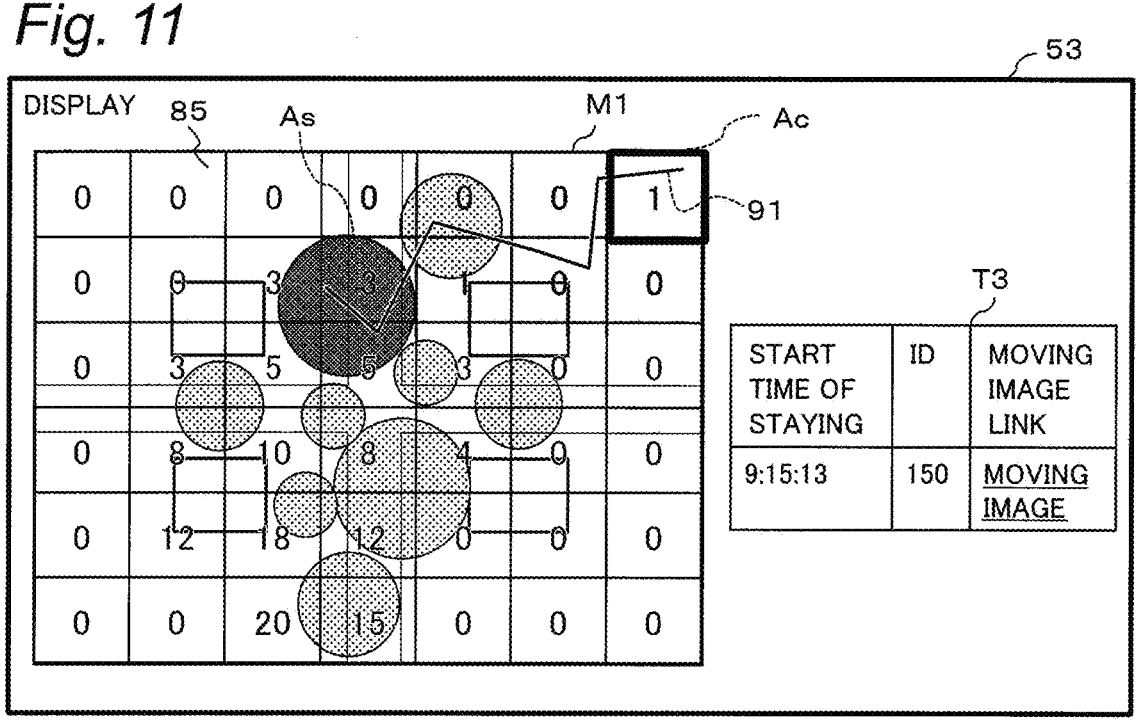
FIG. 11 is a diagram illustrating a display example of the trajectory analysis device according to a second embodiment.

FIG. 11 illustrates a display example of the trajectory analysis device 50 according to the second embodiment. In the present embodiment predetermined division areas 85 are set in the trajectory analysis device 50, for example. The division areas 85 are set in accordance with the map data D2 so as to divide an entire map image M1 into a grid pattern, for example. The trajectory analysis device 50 according to the present embodiment counts, in a state where the staying area As is selected, a number of times that trajectories staying in a staying area As passes through each of the division areas 85. The trajectory analysis device 50 then displays the counted number of passing times on each division area 85.

The display example of FIG. 11 illustrates a state in which a user operation selecting a divided area with the counted number of passing times is "1". The specific division area selected by such a user operation is hereinafter referred to as a "division area Ac". In this display example, the trajectory analysis device 50 extracts, from the trajectories staying in the staying area As, a trajectory 91 passing through the selected division area Ac, and displays the extracted trajectory 91. The trajectory analysis device 50 displays, together with one trajectory 91 that stays in the staying area As and passes through the division area Ac, a moving image list T3 including a moving image link of a moving image associated with the trajectory 91. As a result, the user 30 of the trajectory analysis system 100 according to the present embodiment can easily find a location where the workers 11 and 12 and the like rarely pass in the workplace 200, and analyze the trajectory passing through that location.

Figure 12:
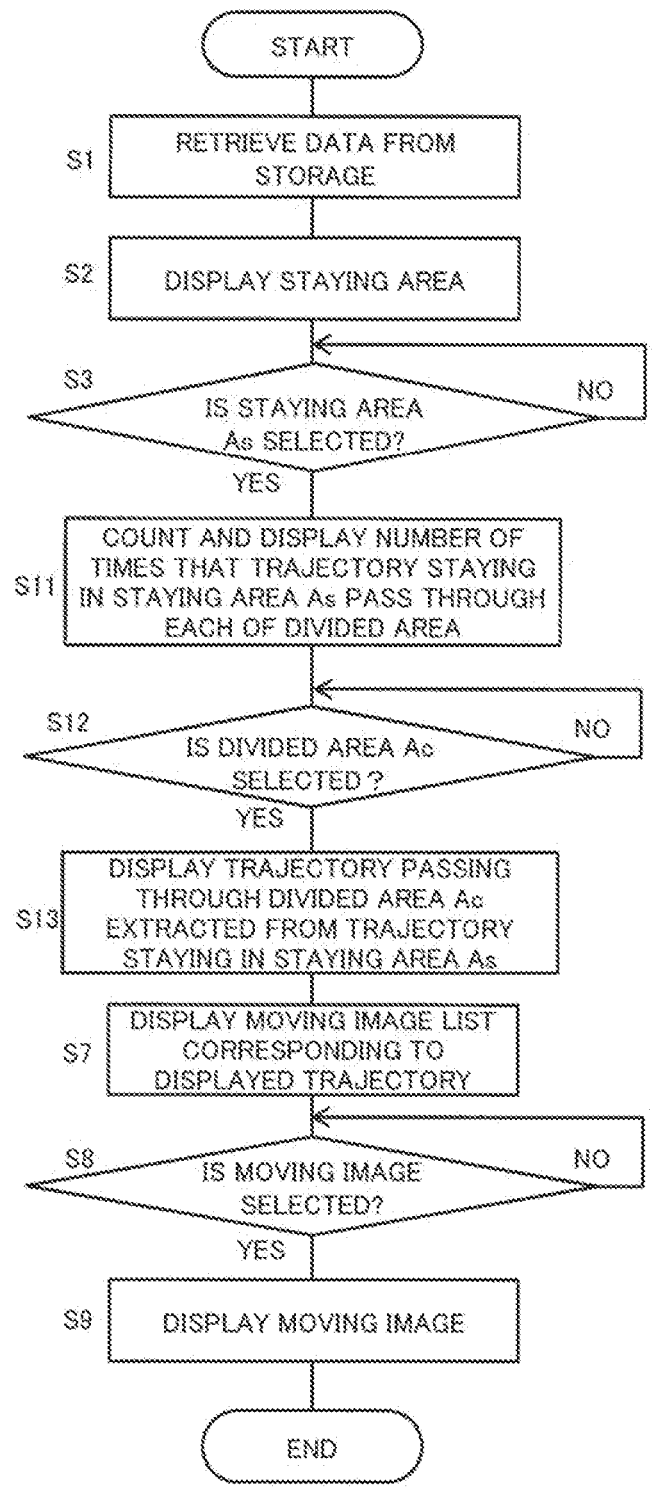
FIG. 12 is a flowchart for describing an operation of a trajectory analyzer in the trajectory analysis device according to the second embodiment.

FIG. 12 is a flowchart for describing an operation or a trajectory analyzer 56 according to the second embodiment. For example, in the trajectory analysis device 50 according to the present embodiment, instead of the processing in steps S4 to S6 in FIG. 10 in the first embodiment, a controller 54 performs processing narrowing down trajectories to be displayed, as illustrated in FIG. 11, through selection of the division area Ac according to the number of times the trajectories passes (S11 to S13).

The controller 54 of the trajectory analysis device 50 according to the present embodiment holds, in an internal memory or the like, information in which the plurality of division areas 85, as illustrated in FIG. 11, are associated with the map image M1 of the map data D2, for example. The controller 54 according to the present embodiment, functioning as the trajectory analyzer 56, counts the number of times a trajectory staying in the staying area As selected in step S3 passes through each division area 85, and causes the display interface 53 to display the number of passing times, superimposed on the map image M1, for each of the division areas 83 (S11). During this processing, the controller 54 may display the trajectory staying in the staying area As, as in S4 of FIG. 10.

The controller 54 as the trajectory analyzer 56 determines whether the user operation for selecting one division area Ac is input through the operation interface 52 (S12).

When the controller 54 determines that the user operation for selecting the division area Ac is not input (NO in S12), the controller 54 repeats the determination in step S12, for example.

When the division area Ac is selected (YES in S12), the controller 54 extracts the trajectory 91 passing through the selected division Ac from the trajectories staying in the staying area As, as in the trajectory analyzer 56 according to the first embodiment. The trajectory analyzer 56 causes the display interface 53 to display the extracted trajectory 91 (S13). As a result, the user 30 of the trajectory analysis system 100 according to the present embodiment, can checks a division area 85 having a small number of passing times and selects it as the division area Ac, for example. This enables the user 30 to analyze a moving image relating to the trajectory so as to study a movement that is not normally made during a work in the workplace 200. The selected division area Ac is an example of a designated location in the present embodiment.

As described above, in the trajectory analysis device 50 according to the present embodiment, the map image M1 of the map data D2 is divided into the plurality of division areas 85. The controller 54 causes the display interface 53 to display the number of times the trajectory staying in the staying area As, as an example of the selected staying location, passes through each of the division areas 85 (S11). The controller 54 accepts a user operation for designating any one of the plurality of division areas 85 as an example of the designated location through the operation interface 52 (input interface) (S12 and S13). As a result, the user 30 of the system 100 can analyze the moving image relating to the trajectory including a peculiar behavior in the workplace 200 by selecting, for example, a location where the trajectory rarely passes.

Other Embodiments

The first to second embodiments are described above as the example of the technique disclosed in this application. However, the technique in the present disclosure is not limited to those, and is applicable also to embodiments in which changes, replacements, additions, omissions and the like are made as appropriate. Another embodiment can be made by combining the components described in the above embodiments.

In the above embodiments, the camera 20 of the moving line analysis system 100, and the movements of the worker 11 and 12 as the example of the moving object are described. In the present embodiment, the moving object is not particularly limited to a person, and may be a vehicle such as a truck, a forklift, or a train.

In the above embodiments, the camera 20 of the moving line analysis system 100 is installed in the workplace 200. The camera 20 according to the present embodiment may be installed in a moving object such as a vehicle instead of the workplace 200. In this case, the moving line data D1 may be generated from the moving image captured by the camera 20 on the moving object using a technique of self-position estimation, for example.

In the above embodiments, the moving line analysis system 100 generates the moving line data D1 based on the moving image data D0 acquired by the camera 20. The moving line analysis system 100 according to the present embodiment may generate the moving line data D1 based on a beacon signal that can be transmitted and received to and from devices installed in the workplace 200 and on the moving object, instead of the moving image data D0 acquired by the camera 20. Further, the moving line data D1 may be generated by tracking the movement of a vehicle or the like using a technique such as a global positioning system (GPS).

In the first embodiment, the trajectory analysis device 50 of the trajectory analysis system 100 displays the moving image list T1 (see FIGS. 9A and 9B) when displaying the trajectories staying in the selected staying area As (S4 in FIG. 10). The trajectory analysis device 50 according to the present embodiment does not have to display the moving image list T1 in particular. Further, the trajectory analysis device 50 according to the present embodiment may display the moving image list T1 only when, the number of trajectories to be displayed is equal to or smaller than a predetermined threshold, and does not have to display the moving image list T1 in other cases for example.

In the first embodiment, the trajectory analysis device 50 receives the user operation designating the passing area Ap, which is an example of the designated location, as a rectangular area to acquire the area information D4 (S6 in FIG. 10). In the trajectory analysis device 50 according to the present embodiment, the passing area Ap is not particularly limited to the rectangular area, and may be an area surrounded by a curved line, for example. Further, the designated location in the present embodiment is not particularly limited to be input as an area, and may be input as a line, for example.

In the first embodiment, the trajectory analysis device 50 inputs the passing area Ap, which is the example of the designated location, and displays the trajectory 90 passing through the passing area Ap and the corresponding moving image list T2 (S6 to S7 in FIG. 10). However, a plurality of passing areas Ap may be designated. Such a modified example will be described with reference to FIG. 13.

Figure 13:
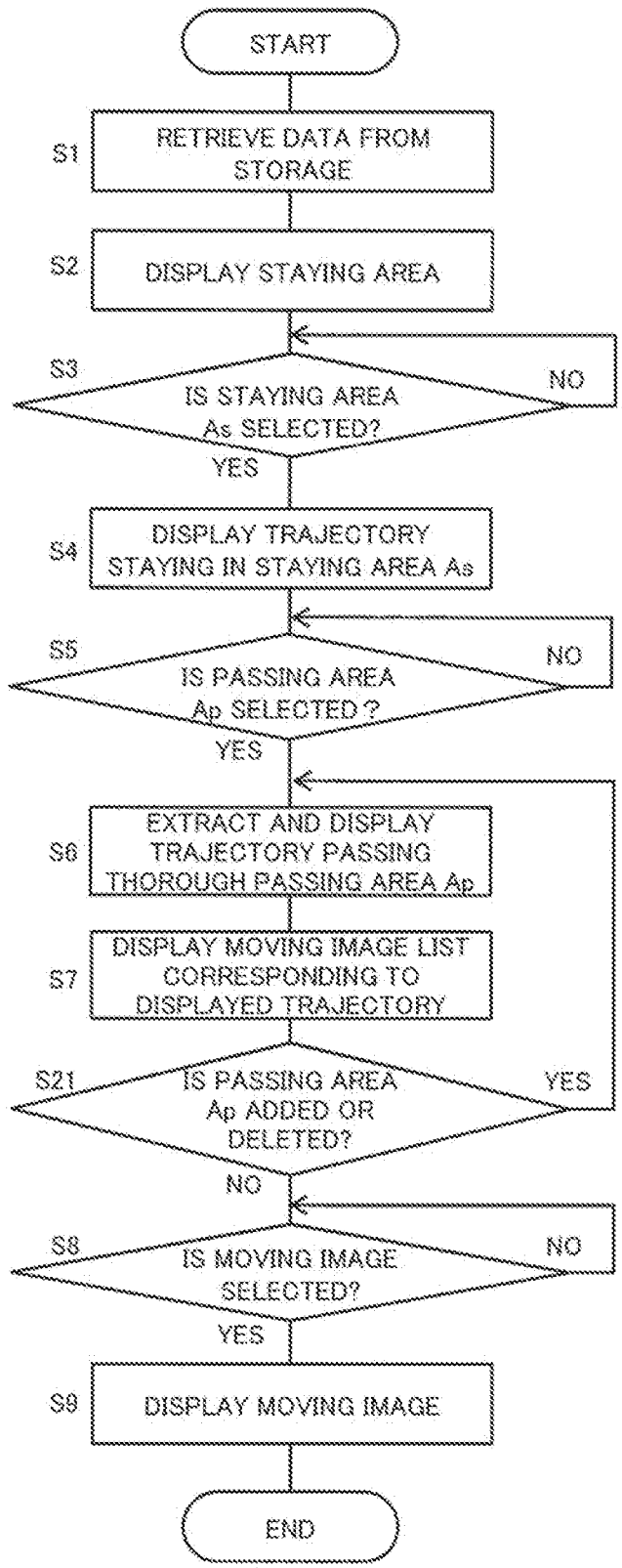
FIG. 13 is a flowchart for describing an operation of a trajectory analyzer in a trajectory analysis device according to a modified example of the first embodiment.

FIG. 13 is a flowchart for describing the operation of the trajectory analyzer 56 in the trajectory analysis device 50 according to the modified example of the first embodiment. For example, in addition to the processing in steps S1 to S9 in FIG. 10, the controller 54 functioning as the trajectory analyzer 56 determines whether an operation adding or deleting the passing area Ap is input by the user 30 (S21), after narrowing down and displaying the trajectories and the like (S6 to S7) by designating the passing area Ap (S5). The operation is input as an operation for designating the passing area Ap to be added or deleted, for example.

When the passing area Ap is added or deleted by the user operation (YES in S21), the controller 54 updates the area information D4 (see FIG. 7) and executes the processing in steps S6 and S7 again. For example, when a plurality of passing areas Ap is added, the controller 54 displays the trajectories 90 and the like passing through all the passing areas Ap (S6 to S7). When no passing area Ap is added or deleted (NO in S21), the controller 54 proceeds to the processing in step S8 and subsequent steps. In this way, when the trajectories 90 and the like to be displayed are narrowed down in accordance with the passing areas Ap added or deleted by the user operation, the user 30 can easily analyze the relevant information on the trajectories 90.

In the above embodiments, the trajectory analysis device 50 receives the user operation selecting moving image links displayed in the moving image lists T1 to T3 (S8 in FIGS. 10 and 12) to display moving images (S9 in FIGS. 10 and 12). The trajectory analysis device 50 according to the present embodiment may display a moving image by receiving a user operation for directly selecting a trajectory without executing the processing in step S8 in particular.

The embodiments are described above as the example of the technique in the present disclosure. For this reason, the accompanying drawings and detailed description are provided.

Therefore, the components described in the accompanying drawings and the detailed description may include not only the components essential for solving the problem but also the components not essential for solving the problem for illustrating the above-mentioned technique. Therefore, it should not be immediately construed that these components that are not essential are essential even if the unessential components are described in the accompanying drawings and the detailed description.

Further, since the above-described embodiments are for exemplifying the technique in the present disclosure, various changes, replacements, additions, omissions and the like can be made within the scope of claims or their equivalents.

The present disclosure is applicable to the trajectory analysis device and the trajectory analysis method displaying relevant information on a trajectory of a moving object.

The invention claimed is:

1. A trajectory analysis device comprising:
    a display interface configured to display relevant information on a trajectory of a moving object, the relevant information including at least one of a moving image associated with the trajectory of the moving object or a list including candidates each indicating the moving image;
    a storage configured to stores trajectory data indicating a plurality of trajectories and the relevant information;
    an input interface configured to receive input by a user operation; and
    a controller configured to control the display interface based on the relevant information stored in the storage and the user operation input on the input interface,
    wherein the controller is configured to:
        cause the display interface to display a plurality of staying areas based on the trajectory data, the plurality of staying areas each being an area in which one or more trajectories included in the plurality of trajectories stays;
        receive a first user operation selecting one staying area from among the plurality of staying areas, the first user operation being received via the input interface;
        extract a set of trajectories from the plurality of trajectories based on the selected one staying area, the set of trajectories being trajectories that stay in the selected one staying area, from among the plurality of trajectories;
        cause the display interface to display the set of trajectories that stay in the selected one staying area;
        receive a second user operation designating a passing area through which at least one of the set of trajectories passes, the designated passing area being different from the selected one staying area, the second user operation being received via the input interface;
        extract at least one trajectory from the set of trajectories based on the designated passing area, the at least one trajectory being a trajectory that passes through the designated passing area, from among the set of trajectories;
        extract the relevant information corresponding to the at least one trajectory; and
        cause the display interface to display the at least one trajectory and the extracted relevant information.

2. The trajectory analysis device according to claim 1,
wherein the storage is configured to further store map data indicating a map on which the moving object is located, and
wherein the controller is configured to cause the display interface to display the staying area superimposed on the map.

3. The trajectory analysis device according to claim 2,
wherein the map is divided into a plurality of divided areas, and
wherein the controller is configured to
    cause the display interface to display, for each of the divided areas, a number of times that the set of trajectories that stay in the selected staying area pass through each of the divided areas, and
    receive a user operation designating any of the plurality of divided areas as the designated passing area via the input interface.

4. The trajectory analysis device according to claim 1,
wherein the list includes moving image links associated with each of the plurality of trajectories indicated by the trajectory data, and
wherein the controller is configured to generate moving image links each associated with the at least one trajectory as the extracted relevant information corresponding to the at least one trajectory.

5. A trajectory analysis method performed by a controller of a computer, comprising:
    causing a display interface to display a plurality of staying areas, based on trajectory data which is stored in a storage and indicates a plurality of trajectories, the plurality of staying areas each being an area in which one or more trajectories included in the plurality of trajectories stays;
    receiving a first user operation selecting one staying area from among the plurality of staying areas, the first user operation being received via an input interface;
    extracting a set of trajectories from the plurality of trajectories based on the selected one staying area, the set of trajectories being trajectories that stay in the selected one staying area, from among the plurality of trajectories;

causing the display interface to display the set of trajectories that stay in the selected one staying area;

receiving a second user operation designating a passing area through which at least one of the set of trajectories passes, the designated passing area being different from the selected one staying area, the second user operation being received via the input interface;

extracting at least one trajectory from the set of trajectories based on the designated passing area, the at least one trajectory being a trajectory that passes through the designated passing area, from among the set of trajectories;

extracting, from relevant information on a trajectory of a moving object and including at least one of a moving image associated with the trajectory of the moving object or a list including candidates each indicating the moving image, the relevant information corresponding to the at least one trajectory; and causing the display interface to display the at least one trajectory and the extracted relevant information.

6. A tangible, non-transitory computer-readable medium storing a program for causing a controller of a computer to perform the trajectory analysis method according to claim 5.

7. A trajectory analysis device comprising:

a display interface configured to display relevant information on a trajectory of a moving object, the relevant information including at least one of a moving image associated with the trajectory of the moving object or a list including candidates each indicating the moving image;

a storage configured to stores trajectory data indicating a plurality of trajectories and the relevant information;

an input interface configured to receive input by a user operation; and a controller configured to control the display interface based on the relevant information stored in the storage and the user operation input on the input interface, wherein the controller is configured to:

cause the display interface to display a plurality of staying areas based on the trajectory data, the plurality of staying areas each being an area in which one or more trajectories included in the plurality of trajectories stays;

receive a first user operation selecting one staying area from among the plurality of staying areas, the first user operation being received via the input interface;

extract a set of trajectories from the plurality of trajectories based on the selected one staying area, the set of trajectories being trajectories that stay in the selected one staying area, from among the plurality of trajectories;

cause the display interface to display the set of trajectories that stay in the selected one staying area;

receive a second user operation designating a passing area through which at least one of the set of trajectories passes, the designated passing area being different from the selected one staying area, the second user operation being received via the input interface;

extract at least one trajectory from the set of trajectories based on the designated passing area, the at least one trajectory being a trajectory that passes through the designated passing area, from among the set of trajectories; and cause the display interface to display the at least one trajectory.

8. The trajectory analysis device according to claim 2, wherein the list includes moving image links associated with each of the plurality of trajectories indicated by the trajectory data, and wherein the controller is configured to generate moving image links each associated with the at least one trajectory as the extracted relevant information corresponding to the at least one trajectory.

9. The trajectory analysis device according to claim 3, wherein the list includes moving image links associated with each of the plurality of trajectories indicated by the trajectory data, and wherein the controller is configured to generate moving image links each associated with the at least one trajectory as the extracted relevant information corresponding to the at least one trajectory.

10. The trajectory analysis device according to claim 1, wherein the relevant information includes, as each of the candidates in the list, at least one of: a staying start time of the trajectory; an ID of the trajectory; or a moving image link associated with the trajectory.

\* \* \* \* \*